United States Patent
Burley

(10) Patent No.: US 11,367,940 B1
(45) Date of Patent: Jun. 21, 2022

(54) PEDESTAL FOR SUPPORTING SATELLITE ANTENNA

(71) Applicant: Airbus DS Government Solutions, Inc., Plano, TX (US)

(72) Inventor: Elijah Burley, Plano, TX (US)

(73) Assignee: Airbus DS Government Solutions, Inc., Plano, TX (US)

( * ) Notice: Subject to any disclaimer, the term of this patent is extended or adjusted under 35 U.S.C. 154(b) by 71 days.

(21) Appl. No.: 17/003,915

(22) Filed: Aug. 26, 2020

Related U.S. Application Data

(60) Provisional application No. 62/892,992, filed on Aug. 28, 2019.

(51) Int. Cl.
  *H01Q 1/12* (2006.01)
  *F16M 11/24* (2006.01)

(52) U.S. Cl.
  CPC ........... *H01Q 1/1235* (2013.01); *F16M 11/24* (2013.01); *F16M 2200/08* (2013.01)

(58) Field of Classification Search
  CPC ........ H01Q 1/1235; H01Q 1/088; H01Q 1/12; F16M 11/24; F16M 11/38; F16M 2200/08
  USPC ........................................ 343/881, 882, 880
  See application file for complete search history.

(56) References Cited

U.S. PATENT DOCUMENTS

| | | | |
|---|---|---|---|
| 2,474,250 A | 6/1949 | Howard et al. | |
| 4,799,642 A * | 1/1989 | Wright | H01Q 1/1221 248/237 |
| 5,363,116 A | 11/1994 | Allen | |
| 5,576,722 A | 11/1996 | Bustillos | |
| 6,229,497 B1 * | 5/2001 | McCracken | H01Q 1/12 343/878 |
| 6,450,464 B1 | 9/2002 | Thomas | |
| 6,630,912 B2 | 10/2003 | Ehrenberg et al. | |

(Continued)

FOREIGN PATENT DOCUMENTS

WO   WO 2019/031631 A1   2/2019

OTHER PUBLICATIONS

Web Article: Datapath™, Q-Series Terminals, Mar. 2017, 2 pages (see https://datapath.com/wp-content/uploads/2017/02/DATAPATH_QSeries_Government.pdf).

(Continued)

*Primary Examiner* — Bradley Duckworth
(74) *Attorney, Agent, or Firm* — Fox Rothschild LLP

(57) ABSTRACT

The pedestal supports a satellite antenna. The pedestal can be used by government or armed forces and allows them to easily and quickly transport and set up the pedestal. The pedestal can withstand harsh environmental conditions while still allowing the satellite antenna being supported by the pedestal to operate in the military communication bands. The pedestal meets military requirements and only allows a small amount of deflection in extreme conditions. The pedestal can be assembled by only two-man and the assembly can be performed entirely by hand without using any machines, tools, or mechanical parts beyond the provided pedestal components. The pedestal is made of carbon fiber which makes the pedestal robust, durable, and light weight. The dissembled pedestal components can be stored and transported in one container. A satellite communications terminal including the pedestal and a satellite antenna is also contemplated.

19 Claims, 12 Drawing Sheets

(56) References Cited

U.S. PATENT DOCUMENTS

| | | | |
|---|---|---|---|
| 7,755,564 B2 * | 7/2010 | Gonzalez | H01Q 19/134 343/915 |
| 8,174,461 B1 | 5/2012 | Smith | |
| 8,319,697 B2 * | 11/2012 | Conrad | H01Q 19/12 343/881 |
| 8,495,912 B2 * | 7/2013 | Kjerstad | G01V 3/15 73/170.29 |
| 8,505,867 B2 | 8/2013 | Conrad | |
| 8,960,615 B1 | 2/2015 | Johnson et al. | |
| 9,163,774 B2 * | 10/2015 | Orlov | F16M 11/2078 |
| 9,242,764 B2 * | 1/2016 | Zetterlund | F16M 11/38 |
| 9,388,547 B2 * | 7/2016 | Kellner | E04H 17/22 |
| 9,577,313 B2 | 2/2017 | Nielsen | |
| 10,122,092 B2 | 11/2018 | Clayton et al. | |
| 2012/0112033 A1 * | 5/2012 | Oyen | E04H 12/185 248/523 |

OTHER PUBLICATIONS

Web Article: General Dynamics SATCOM Technologies, ManPak®T C060FM, C060FA Next Generation Flyaway Terminal, 2 pages, May 2019 https://gdmissionsystems.com/-/media/General-Dynamics/Satcom/PDF/Antennas/Flyaway-Antennas/ManPak-C060FM-FA-Flyaway-Small-Deployable-Antenna-Datasheet.ashx?la=en&hash=A28092B26DEDB3C87BEEA248F140D3EAB4B59EB0).

Web Article: General Dynamics, ManPak®T C100FM, C100FA Next Generation Flyaway Terminal, 2 pages https://gdmissionsystems.com/products/satcom-technologies/antennas/flyaway-antennas/manpak-c100-fm-fa-flyaway-small-deployable-antenna).

* cited by examiner

TECHNICAL SPECIFICATIONS

| RF PERFORMANCE | Ku-band | X/Ka-band |
|---|---|---|
| Linear EIRP (at midband) | Ku = 73.6 dBW (250W SSPA) | X = 70.8 dBW / Ka = 71.0 dBW (400W/50W SSPA) |
| G/T[1] (typ. Midband) | Ku = 31.4 dB/K | X = 26.6 dB/K / Ka = 31.4 dB/K |

| ENVIRONMENTAL & MECHANICAL PERFORMANCE | Operating Conditions (Typical) | |
|---|---|---|
| Pointing | Meeta MIL-STD-188-164B | |
| Wind Loading | Operational | Survival |
| Range | 45 mph gusting to 60 mph | 100 mph stowed |
| Temperatures | Operational -30 °C to +55 °C (-22 °F to +131 °F) | |
| Altitude | Operational up to 10,000 ft / Survival up to 40,000 ft | |
| Shock | As encountered by Air, Ship, Rail and Truck | |
| Atmospheric | As encountered in moderately corrosive coastal and industrial environments | |
| Solar Radiation | 360 BTU/h/ft2 (1135 watts/m2) | |
| Rain | Up to 10 cm/h (4 in/h) | |
| Relative Humidity | 0% to 100% | |
| Reflector | Multi-Band Interchangeable | |
| Color | White, Desert Tan, OD Green | |
| Material | Carbon Fiber | |
| Segments | Nineteen | |
| Feed Type | Axisymmetric Gregorian dual optics | |
| Mount Type | El over Az Pedestal | |
| Pointing Range | | |
| Azimuth | 120° continuous (+/-60°) with sectored pedestal allowing 360° of course adjustment | |
| Elevation | 0° to 90° Boresight | |
| Polarization | ±100° | |
| Maximum Travel Limits | User defineable within mechanical limits | |
| Operating limits | Hardware and Software Settable | |

| ELECTRICAL SPECIFICATIONS | |
|---|---|
| Controller Type | Multi Axis Tracking Controller with Auto Acquisition Assist |
| Controller Package | Single Box Outdoor Motor Controller - 4RU 19" EIA Rack Mounted Outdoor Controller |
| Prime Power | 110-220 VAC 50/60 Hz (Universal) |
| Remote IDU Interconnect | Ethernet |
| Remote Interface | Remote Operation Software, SNMP |
| IDU/ODU IFL | Multi Mode Fiber Optic Cable |

G/T is typical for single thread 55 K LNA (X-band), 110 K LNA (Ka-band) and 60 K LNA (Ku-band) connected directly to the feed flange and does not include post LNA contributions. Elevation angle is 30 degrees.

FIG. 11

PEDESTAL FOR SUPPORTING SATELLITE ANTENNA

CROSS-REFERENCE TO RELATED APPLICATIONS

This application claims the benefit of U.S. Provisional Application 62/892,992, filed on Aug. 28 2019, the entirety of which is expressly incorporated herein by reference thereto.

FIELD OF THE INVENTION

The present invention relates to antennas and more particularly to portable, lightweight pedestals for supporting dish antennas that can withstand harsh environmental conditions and be deployed quickly.

BACKGROUND OF THE INVENTION

One of the main components in a radio communications system is the antenna. Many radio communications systems use directional antennas, which must be pointed in a desired direction to allow communications to be established. Increasingly, radio communications systems are using larger antennas to provide higher gain and prevent terrestrial interference and interference from other satellites with signal being radiated or received by the antenna. Larger antennas, however, are more directional, and therefore must be pointed more accurately.

In order to maintain accurate pointing, an antenna requires a stable mount. For antennas mounted in a fixed location and pointed in a fixed direction, providing a sufficiently stable mount is usually not a problem. For example, concrete foundations can be engineered to provide the desired amount of stability.

Transportable antennas, however, present a number of challenges. Maintaining accurate and stable pointing for a large antenna generally requires a large and stable mount for the antenna. It is generally not practical to provide highly stable concrete footings or other engineered foundations for a transportable antenna. Providing large and heavy mounting structure is also undesirable, as this represents additional weight and volume that is transported. For example, in military applications, the mounting structure along with the antenna may need to be broke down into multiple shipping containers that meet the maximum standards for air delivery, which can lead to complex assembly procedures, excessive assembly time, and the requirement of multiple personnel to assemble and disassemble the communications system. Moreover, a transportable antenna may be exposed to severe weather (in contrast to a radome-protected fixed antenna), and therefore stability in those conditions may also be needed.

Accordingly, providing a stable mounting system for a large transportable antenna and other types of antennas remains an unmet need. Embodiments of the present invention remedy some or all of the above and/or can address other problems.

SUMMARY OF THE INVENTION

In accordance with principles of the invention, a pedestal for supporting a satellite antenna is contemplated. The pedestal comprises a center tube, a top spar, a bottom spar, and a foot pad. The center tube includes a multi-prong connector which includes a prong having a socket and a threaded surface adapted to connect with a center tube connector of a top spar and another prong having a socket and a threaded surface adapted to connect with a center tube connector of another top spar. The center tube also includes a quick-release pin and a pin supporting structure supporting the pin. The quick-release pin and pin supporting structure are adapted to connect with a center tube connector of a bottom spar.

The top spar includes center tube connectors. Each of the center tube connectors includes a protrusion and a cap with a threaded surface. The protrusion and cap of the center tube connector are adapted to engage the socket and threaded surface of the prongs. The top spar also includes bottom spar connectors. Each of the bottom spar connectors includes a protrusion and a cap with a threaded surface. The protrusion and cap of the bottom spar connector are adapted to engage a socket and threaded surface of a top spar and foot pad connector on a bottom spar.

The bottom spar includes a center tube connector. The center tube connector is adapted to engage the pin supporting structure and including a hole to receive the pin. The bottom spar also includes a top spar and foot pad connector. The top spar and foot pad connector include sockets with threaded surfaces to engage the protrusions and caps of the bottom spar connectors on the top spar, and a protrusion to engage a foot pad connector of a foot pad.

The foot pad includes a foot pad joining apparatus. The apparatus includes a socket adapted to connect with the protrusion of the top spar and foot pad connector on the bottom spar, and a tray connector adapted to connect with a connector of a foot pad tray. The tray connector includes a bracket with holes to receive a quick-release pin. The foot pad also includes a foot pad tray. The tray includes a mechanical knuckle and a quick-release pin in the knuckle. The knuckle without the pin fits in the bracket.

In one embodiment, the cap of the center tube connector is adapted to turn by hand to tighten the connection between the top spar and the center tube.

In one embodiment, the cap of the bottom spar connector is adapted to turn by hand to tighten the connection between the top spar and the bottom spar.

In one embodiment, the top spar includes a region to receive a portion of the bottom spar.

In one embodiment, the top spar includes two columns defining a bottom spar receiving region to receive a portion of the bottom spar. The bottom spar connectors on the top spar are positioned at tips of the two columns.

In one embodiment, the foot pad tray includes a mesh wire bottom surface for receiving weights.

In one embodiment, each of the center tube, top spar, bottom spar, and foot pad is made of carbon fiber or primarily carbon fiber.

In one embodiment, each of the center tube, top spar, bottom spar, and foot pad has a weight that can be carried by no more than two average men and are adapted to be assembled using conventional off-the-shelf hardware tools such as wrench, screwdriver, or other hand tool.

In one embodiment, each of the center tube, top spar, bottom spar, and foot pad is made of carbon fiber, or other materials and then be covered with carbon fiber, and a UV protectant clear coat and a protective over-laminate film are further applied to each of the center tube, top spar, bottom spar, and foot pad.

In accordance with principles of the invention, another pedestal for supporting a satellite antenna is contemplated. The pedestal comprises a center tube, a top spar, a bottom spar, and a foot pad. The center tube includes a top spar connector and a bottom spar connector. The top spar connector is adapted to connect with a center tube connector of a top spar and a center tube connector of another top spar. The bottom spar connector is adapted to connect with a center tube connector of a bottom spa.

The top spar includes a center tube connector adapted to connect with the top spar connector of the center tube and a bottom spar connector adapted to connect with a top spar connector of a bottom spar.

The bottom spar includes a center tube connector adapted to connect with the bottom spar connector of the center tube and a top spar and foot pad connector adapted to connect with the bottom spar connector of the top spar and a foot pad connector of a foot pad.

The foot pad includes a foot pad joining apparatus and a foot pad tray. The foot pad joining apparatus includes a foot pad connector adapted to engage the top spar and foot pad connector and a tray connector adapted to connect with a connector of the foot pad tray. The foot pad tray includes a connector adapted to connect with the tray connector of the foot pad joining apparatus.

In one embodiment, the center tube connector of the top spar includes a protrusion and a cap with a threaded surface.

In one embodiment, the center tube connector of the bottom spar includes a protrusion and a cap with a threaded surface.

In one embodiment, the top spar connector of the center includes a socket and a threaded surface.

In one embodiment, the top spar and foot pad connector includes a socket and a threaded surface to connect with the top spar.

In one embodiment, the top spar and foot pad connector includes a protrusion to connect with the foot pad.

In one embodiment, each of the center tube, top spar, bottom spar, and foot pad has a weight that can be carried by no more than two average men and are adapted to be assembled using conventional off-the-shelf hardware tools such as wrench, screwdriver, or other hand tool.

In one embodiment, each of the center tube, top spar, bottom spar, and foot pad is made of carbon fiber, or other materials and then be covered with carbon fiber, and a UV protectant clear coat and a protective over-laminate film are further applied to each of the center tube, top spar, bottom spar, and foot pad.

In accordance with principles of the invention, a satellite communication terminal including one of the above pedestals and a satellite antenna supported by the pedestal is also contemplated.

In one embodiment, the satellite antenna includes a parabolic reflector having a 4 meter diameter or radius. The parabolic reflector is assembled from a plurality of reflector pieces.

In one embodiment, the satellite antenna supports a military communication band.

In one embodiment, the terminal is a MIL-STD-188-164B or MIL-STD-810G compliant structure.

In accordance with principles of the invention, another pedestal for supporting a satellite antenna is contemplated. The pedestal comprises a center tube, a top spar, a bottom spar, and a foot pad. The center tube includes a multi-prong connector. The multi-prong connector includes a prong having a socket and a threaded surface adapted to connect with a center tube connector of a top spar and another prong having a socket and a threaded surface adapted to connect with a center tube connector of another top spar, and a bottom spar connector, The top spar includes center tube connectors. Each of the center tube connectors includes a protrusion and a cap with a threaded surface. The protrusion and cap of the center tube connector are adapted to engage the socket and threaded surface of the prongs. The top spar also includes bottom spar connectors. Each of the bottom spar connectors includes a protrusion and a cap with a threaded surface. The protrusion and cap of the bottom spar connector are adapted to engage a socket and threaded surface of a top spar and foot pad connector on a bottom spar.

The bottom spar includes a center tube connector to connect with the center tube and a top spar and foot pad connector. The top spar and foot pad connector includes sockets with threaded surfaces to engage the protrusions and caps of the bottom spar connectors on the top spar, and a protrusion to engage a foot pad connector of a foot pad.

The foot pad is configured to connect with the protrusion of the top spar and foot pad connector on the bottom spar and includes a wire mesh bottom surface for receiving weights.

BRIEF DESCRIPTION OF THE DRAWINGS

For the present invention to be clearly understood and readily practiced, the present invention will be described in conjunction with the following figures, wherein:

FIG. 11 depicts illustrative technical specifications of a satellite communications terminal in accordance with some embodiments of the invention.

Figure 1A:
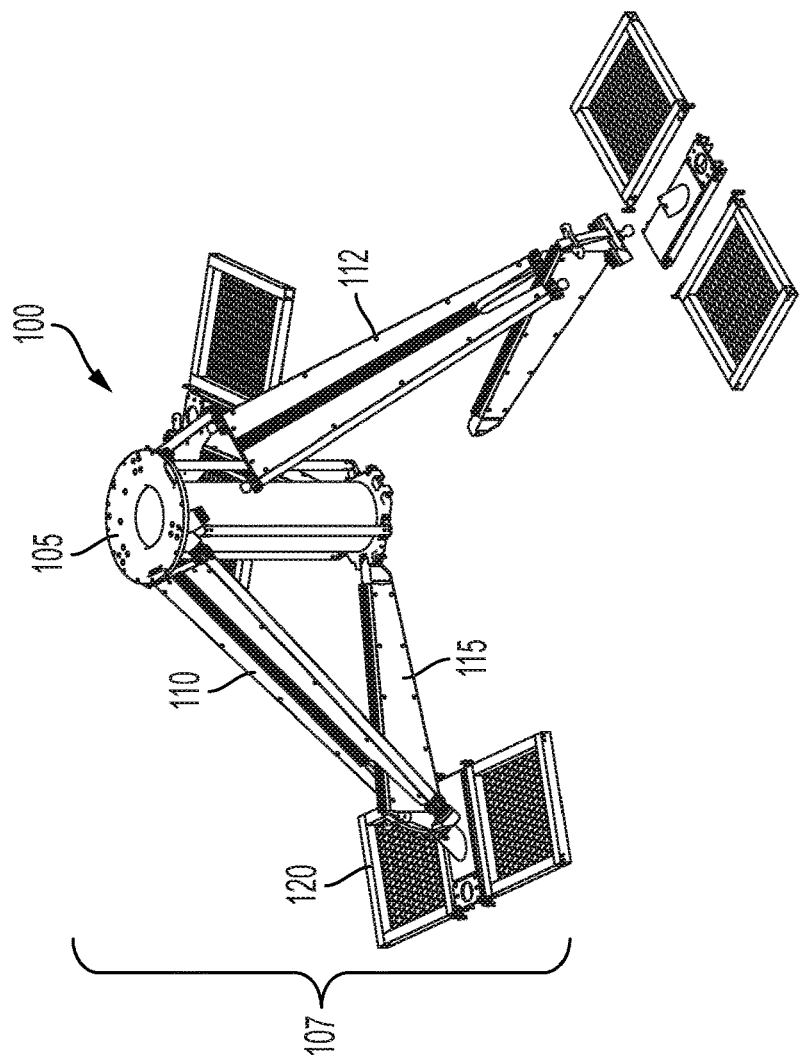
FIGS. 1a-1b depict a perspective view of an illustrative pedestal for supporting a satellite antenna in accordance with some embodiments of the invention.

The components in the figures are not necessarily drawn to scale, emphasis instead being placed upon illustrating the principles of the invention. Moreover, in the figures, like reference numerals designate corresponding parts throughout the different views. However, like parts do not always have like reference numerals. Furthermore, all illustrations are intended to convey concepts, where relative sizes, shapes and other detailed attributes may be illustrated schematically rather than literally or precisely.

DETAILED DESCRIPTION OF THE INVENTION

Embodiments of the invention are related to a pedestal for supporting a satellite antenna. The pedestal is designed to be used by government or armed forces and allows them to easily and quickly transport and set up the pedestal. The pedestal can withstand extreme temperature, wind, precipitation, vibration, other conditions while still allowing the satellite antenna being supported by the pedestal to operate in the military communication bands or super high frequency bands. The pedestal meets military requirements and only allows a small amount of deflection in extreme weathers or war (e.g., pointing in the required direction and communicate in the required bands). The pedestal can be assembled by only a few people (e.g., no more than two people is required) and the assembly can be performed by using only a few tools or basic tools (e.g., wrenches, hex keys, screwdrivers, pin spanners, hoist lift, or a combination thereof). The pedestal is made of carbon fiber which makes the pedestal robust, durable, and light weight. The disassembled pedestal components can be stored and transported in one container. Existing pedestals are many times larger and heavier and require multiple containers to store and transport the pedestal. A satellite communications terminal including the pedestal and a satellite antenna is also contemplated.

Figure 1B:
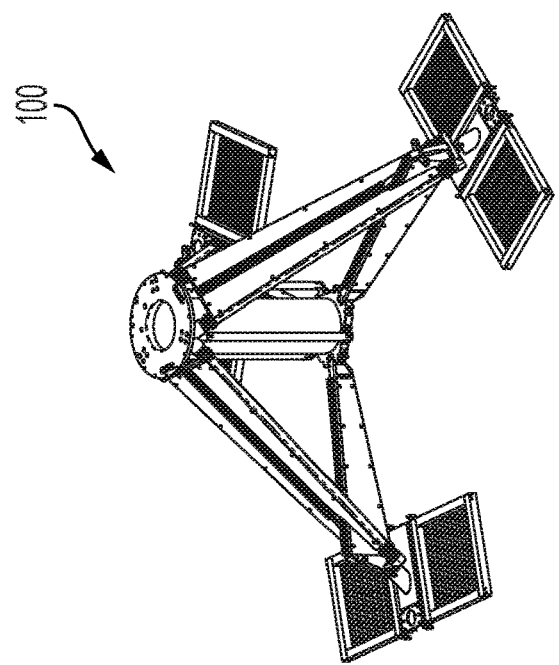

FIGS. 1a-1b depict an illustrative pedestal 100 for supporting a satellite antenna. The pedestal 100 comprises a center tube 105 and a plurality of leg assemblies 107. The pedestal 100 includes three leg assemblies, but it is understood that the pedestal 100 may have other numbers of leg assemblies such as two leg assemblies or more than three leg assemblies. Each of the leg assemblies 107 includes a top spar 110, a bottom spar 115, and a foot pad 120. The entire pedestal 100 can be assembled and disassembled by using a few tools such as wrenches, hex keys, screwdrivers, pin spanners, hoist lift, or a combination thereof. For example, the assembly and disassembly may require only using a pin spanner and hoist lift.

Before assembly, each individual center tube 105, top spar 110, bottom spar 115, and foot pad 120 can be stored in a container and they can be the only components, tools, and/or parts provided by the container for assembling the pedestal (e.g., referring to the pedestal only, but the container may include a satellite antenna and other devices required for radio communications). The container with the pedestal components can be transported to different locations where the pedestal is desired, or where a satellite antenna for radio communications needs to be supported by a pedestal. Each component of the pedestal can be retrieved from the container and the pedestal can be assembled on the spot such as a remote location or deserted area where no other mechanical tools and parts are available. After using the pedestal, the pedestal can also be disassembled on the spot without using tools and stored in the container. The container with the pedestal components can then be delivered to the next location. The weight and structure of each pedestal component are designed such that the pedestal can be assembled and disassembled by just a few operators (e.g., no more than two people). The two operators only need to use a few tools such as wrenches, hex keys, screwdrivers, pin spanners, hoist lift, or a combination thereof to assemble or dissemble the pedestal. For example, the two operators may only need to use a pin spanner and hoist lift to assemble and disassemble the pedestal.

Figure 2B:
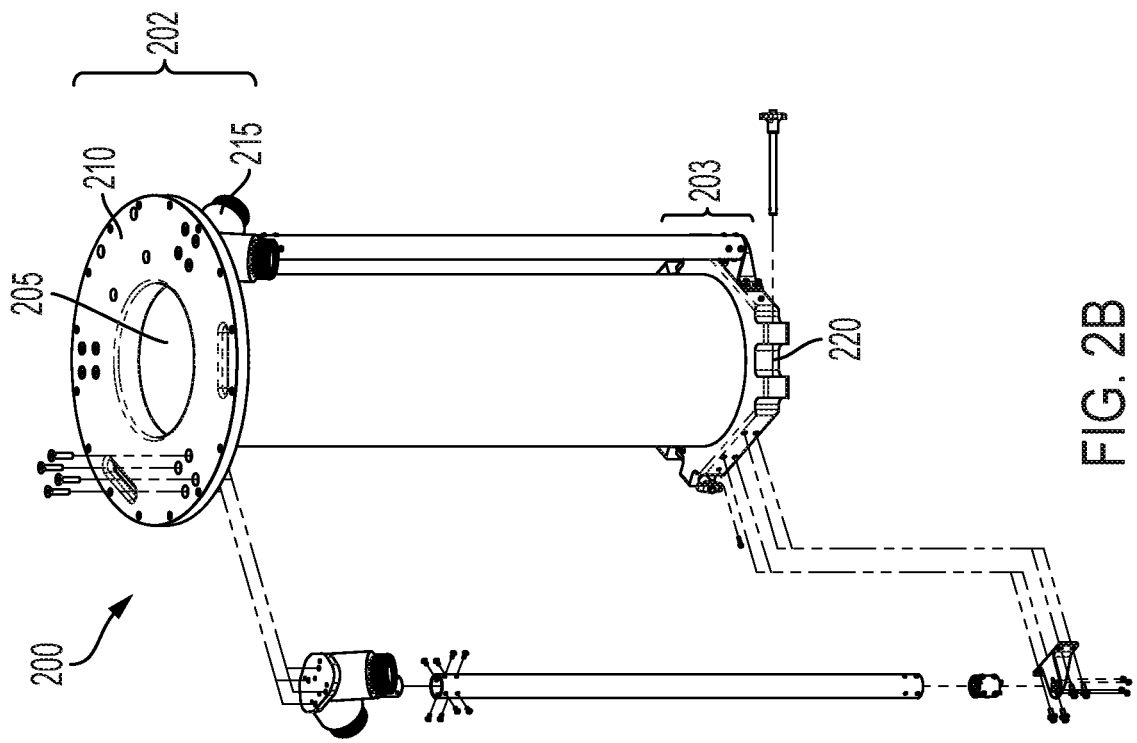
FIGS. 2a-2b depict an illustrative center tube in accordance with some embodiments of the invention.
Figure 2A:
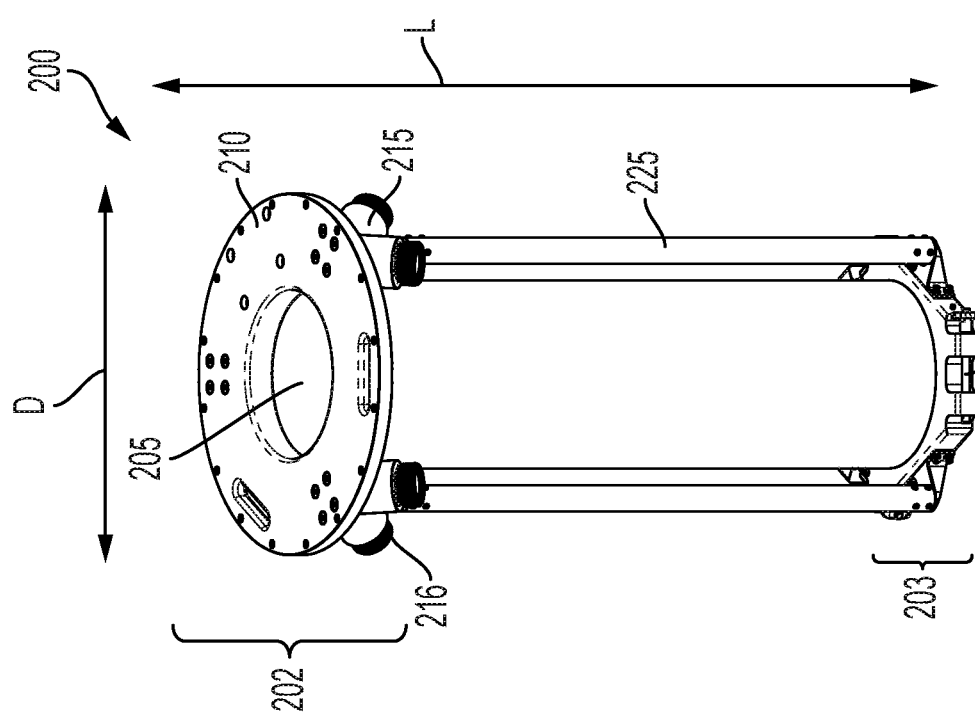

FIGS. 2a-2b depict an illustrative center tube 200. FIG. 2b is an exploded view of the center tube 200. The tube 200 comprises a top end 202, a bottom end 203, and a hollow section 205 extending from the top end 202 to the bottom end 203. The tube 200 also comprises a plate 210 and a top spar connector 215 secured to the plate 210, and the plate 210 and the top spar connector 215 are located in the top end 202. The top spar connector 215 is secured below the plate 210 and faces downward or toward the assembling surface (e.g., the sockets face downward or toward the assembling surface). The tube 200 also comprises a bottom spar connector 220 located on the bottom end 203. The tube 200 further comprises a pipe 225 extending from the top end 202 to the bottom end 203. The pipe 225 is attached to the top spar connector 215 in one end and is attached to an area between adjacent bottom spar connectors in another end. The top end 202 or the plate 210 is adapted to connect with a satellite antenna. The top spar connector 215, bottom spar connector, 220, and pipe 225 are on an exterior surface of or external to the tube 200 (not inside the hollow section 205).

The top spar connector 215, in one embodiment, includes a multi-prong connector with one prong adapted to connect with a top spar (e.g., 110, FIG. 1) and another prong adapted to connect with another top spar (e.g., 112, FIG. 1). In other words, the two prongs in the multi-prong connector are adapted to connect two different top spars or two adjacent top spars (e.g., mechanism 305 of one top spar and mechanism 305 of another top spar). Each of the two prongs includes a structure, and the corresponding structure on the top spar for connecting with the prong, that allow the prong and the top spar to be joined by hand only, without using any tools. For example, the prong may include a socket and a threaded surface, and the corresponding structure on the top spar may include a protrusion (305a, FIGS. 3a-3b) to be inserted into the socket, a cap (305b, FIGS. 3a-3b) with a threaded surface adapted to receive and engage with the threaded surface on the prong and to tighten the connection between the prong and the top spar by hand. During assembly of the pedestal, the user (or installer) aligns and inserts the protrusion 305a into the socket on the prong and tightens the connection by turning the cap 305b in one direction so that the threaded surface on the cap 305b gradually engages the threaded surface on the prong until the entire threaded surface on the cap 305b is in contact with the entire threaded surface on the prong (or until a point where the cap cannot longer be rotated). Likewise, the prong and the corresponding structure of the top spar could be disengaged by rotating the cap in another direction to loosen the connection. This action also can be done by hand only, without using any tools. The multi-prong connector may include a third prong to which one end of the pipe 225 is secured.

The bottom spar connector 220, in one embodiment, includes a pin that can engage with a hole (425, FIG. 4) on the bottom spar (400, FIG. 4). The pin may be a quick-release pin. During assembly of the pedestal, the quick-release pin is released from a pin supporting structure on the bottom end 203, the hole 425 of the bottom spar 400 is aligned with the holes of the pin supporting structure, and the quick-release pin is inserted through the holes of the pin supporting structure and the hole 425 of the bottom spar 400 to lock the bottom spar 400 with the center tube 200. The bottom spar 400 can be disengaged by pulling the release pin out from the pin supporting structure. The engagement and disengagement of the bottom spar 400 with the center tube 200 can be by hand only, without using any tools.

Figure 3A:
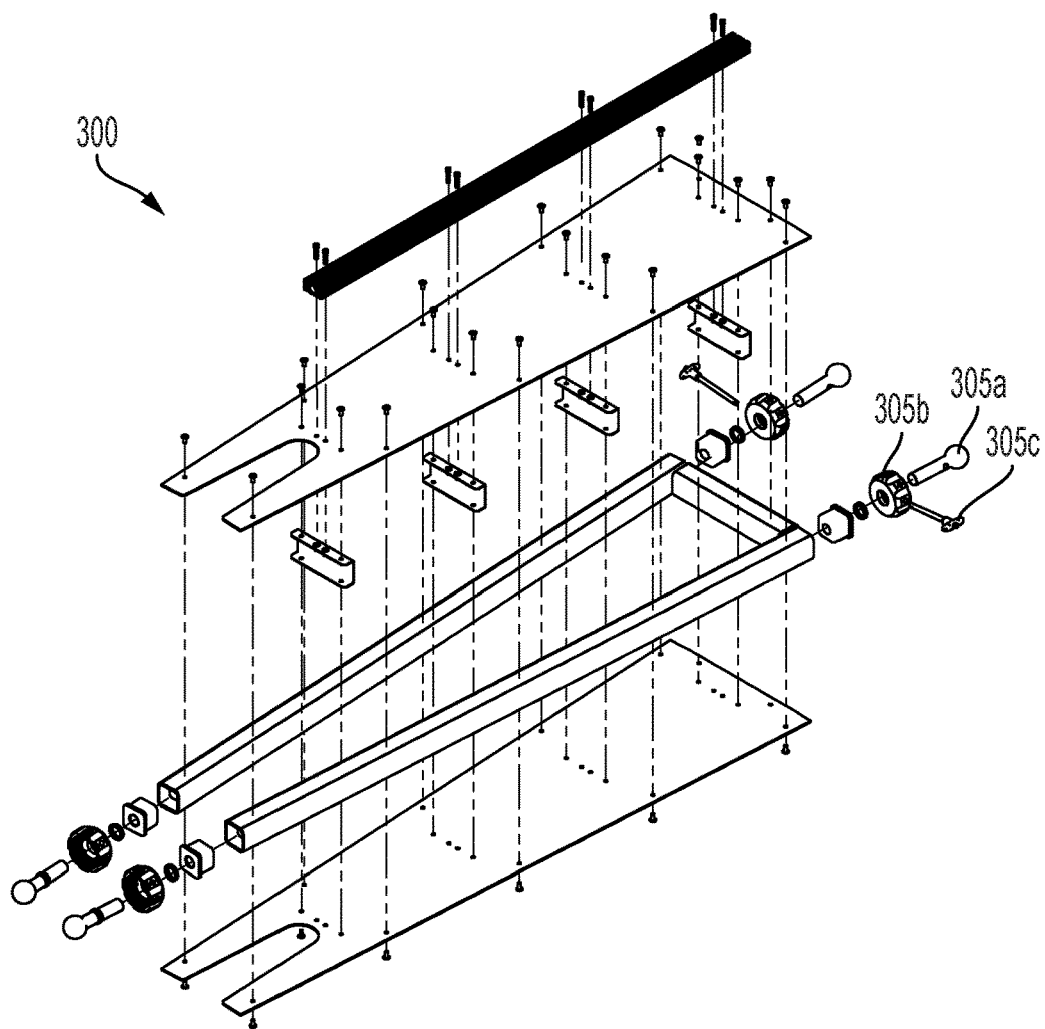
FIGS. 3a-3b depict an illustrative top spar in accordance with some embodiments of the invention.
Figure 3B:
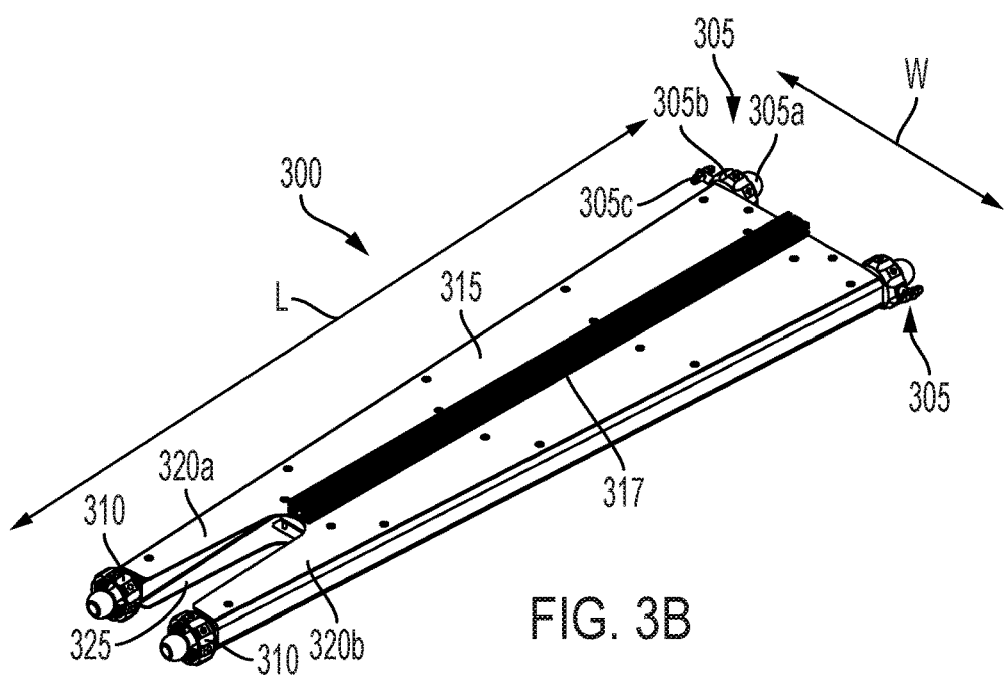

FIGS. 3a-3b depict an illustrative top spar 300. FIG. 3a is an exploded view of the top spar 300. The top spar 300 includes a structure or mechanism 305 adapted to engage with a prong of the top spar connector 215, a structure or mechanism 310 adapted to engage with a corresponding structure on the foot pad 120, and a body 315 to which the mechanisms 305 and 310 are attached. After assembling the pedestal, the top spar 300 supports part of the total weight of the center tube 105 and the satellite antenna. The weight is distributed onto the body 315 via the mechanism 305 and then onto the foot pad 120 via the mechanism 310. The top spar 300 is in a diagonal direction or orientation with respect to the ground or other assembling surface (e.g., the flatbed of a vehicle) after assembly.

The mechanism 305 includes a protrusion 305a to be inserted into a socket of a prong of the top spar connector 215, a cap 305b with a threaded surface adapted to engage a threaded surface on the prong and to tighten the connection between the mechanism 305 and the prong by hand. Each of the cap 305b and body 315 may include an opening through which the protrusion 305a can be inserted, and the cap 305b and protrusion 305a can be secured to the body 315 by a quick-release pin (each of the cap 305b and protrusion 305a includes a hole for receiving the pin). The protrusion 305a may include a round or spherical portion (e.g., ball) to be inserted into the socket of the prong. The top spar 300 includes another mechanism 305 that is adapted to engage with a prong of another top spar connector (e.g., top spar connector 216 in FIG. 2, not top spar connector 215). The mechanisms 305 are located on an upper end of the top spar 300. The mechanisms 305 may be referred to as the center tube connectors. The mechanism 310 is similar to the mechanism 305 except that the mechanism 310 may not include a quick-release pin. The mechanism 310 is located on a lower end of the top spar 300. The mechanism 310 may be referred to as the bottom spar connector.

The body 315 includes two columns 320a, 320b defining a bottom spar receiving region 325 adapted to receive a portion of the bottom spar 115. That portion of the bottom spar 115 may extend through the region 325 to connect with the foot pad. The mechanism 310 is secured to a tip of one of the two columns (e.g., 320a) and the bottom spar 300 includes another mechanism 310 that is secured to a tip of another one of the two columns (e.g., 320b). The two columns 320a, 320b with the receiving region 325 can be positioned over (straddle) the bottom spar, or at least over the portion of the bottom spar 115 that is to be inserted into the region 325. The top spar 300 also includes a structure 317, such as an extrusion, beam, rod, or the like, on the body 315 to engage a groove in a compartment of a container for storing the pedestal. The container for storing the pedestal includes a compartment for storing the top spar and the compartment includes a groove for receiving the structure 317 of the top spar 300. The structure 317 of the top spar 300 is aligned with and inserted into the groove of the compartment. The top spar 300 can slide into the compartment via the structure 317 and groove by pushing the top spar 300 into the compartment.

Figure 4A:
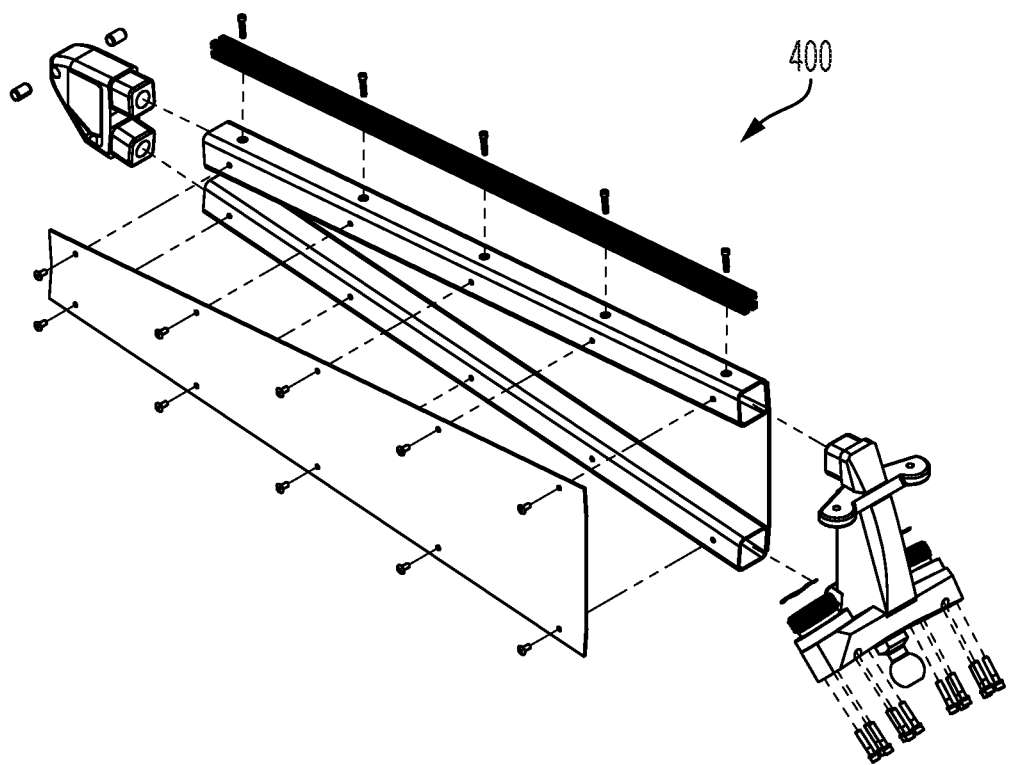
FIGS. 4a-4b depict an illustrative bottom spar in accordance with some embodiments of the invention.
Figure 4B:
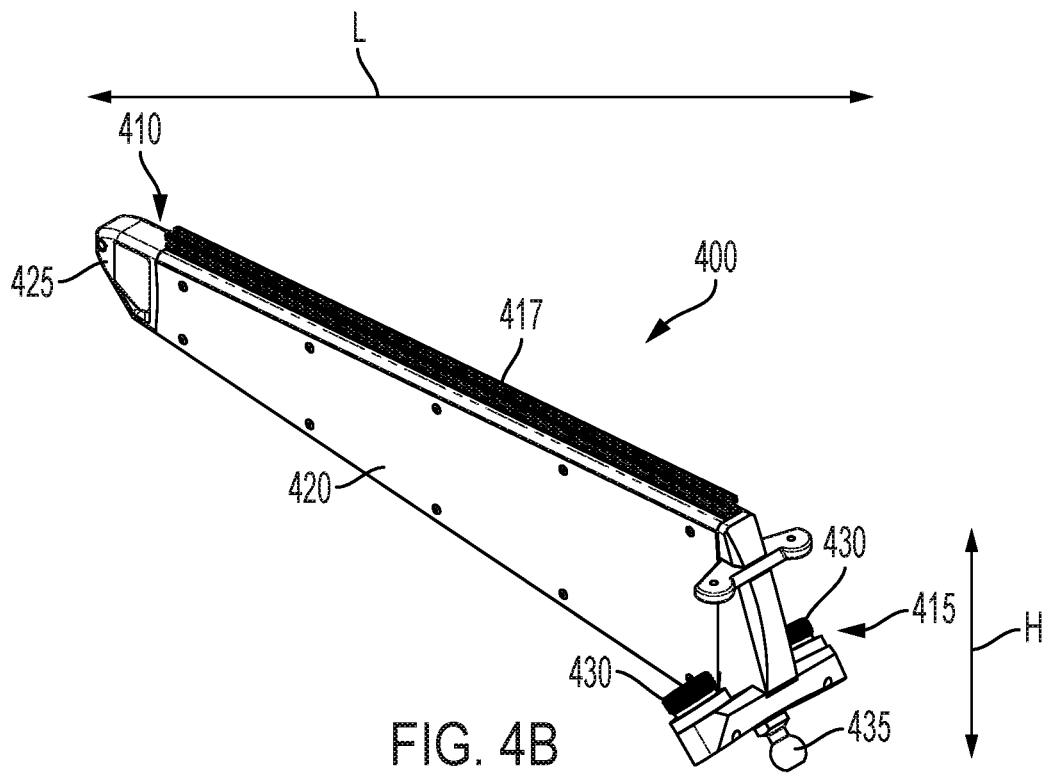

FIGS. 4a-4b depict an illustrative bottom spar 400. FIG. 4a is an exploded view of the bottom spar 400. The bottom spar 400 includes a center tube connector 410, a top spar and foot pad connector 415, and a body 420 to which the center tube connector 410 and the top spar and foot pad connector 415 are attached. The center tube connector 410, in one embodiment, includes a hole 425 and is adapted to engage with the bottom spar connector 220. The quick-release pin from the bottom spar connector 220 is inserted through the holes of the pin supporting structure and the hole 425 of the center tube connector 410 to lock the bottom spar 400 with the center tube 200. The bottom spar 400 can be disengaged by pulling the release pin out from the pin supporting structure. The engagement and disengagement of the bottom spar 400 with the center tube 200 can be done by hand only, without using any tools. The center tube connector 410 is located on one end of the bottom spar 400. The top spar and foot pad connector 415 is located on another end of the bottom spar 400.

The top spar and foot pad connector 415, in one embodiment, includes a socket and threaded surface 430 to engage with the top spar 300 and a protrusion 435 to engage with the foot pad 120. The mechanism 310 on the top spar 300 can be connected to the socket and threaded surface 430. The protrusion of the mechanism 310 can be aligned and inserted into the socket 430 on the connector 415 and the connection between the mechanism 310 and the socket 430 can be tightened by turning the cap of the mechanism 310 in one direction so that the threaded surface on the cap gradually engages the threaded surface on the socket 430 until the entire threaded surface on the cap is in contact with the entire threaded surface on the socket 430 (or until a point where the cap cannot longer be rotated). Likewise, the mechanism 310 and the socket 430 can be disengaged by rotating the cap in another direction to loosen the connection. The engagement and disengagement of the mechanism 310 and socket 430 can be done by hand only (e.g., tightening or loosening the cap), without using any tools. The sockets 430 may be referred to as the top spar connector.

The protrusion 435 engages with the foot pad 120 through a socket on the foot pad (510, FIG. 5). In one embodiment, the protrusion 435 can be pushed into the foot pad connector 510 and the protrusion 435 and the foot pad connector are dimensioned and structured in a manner such that the foot pad connector 510 automatically locks the protrusion 435 in place after the protrusion 435 is inserted into the foot pad connector 510. The protrusion 435 may be a rounded or spherical object (e.g., ball) and the foot pad socket 510 may have a rounded, spherical, or other corresponding structure adapted to receive that object. The bottom spar 400 can be disengaged from the foot pad by pulling the protrusion 435 out of the foot pad socket 510 (by applying a pulling force that is greater than the locking force exerted by the foot pad connector). The engagement and disengagement of the protrusion 435 and the foot pad connector 510 can be done by hand only, without using any tools.

The top spar 300 can be placed over the bottom spar 400 such that the bottom spar 400 is in the receiving area 325 and the columns 320a, 320b straddle the bottom spar 400 (the bottom spar 400 is between the columns 320a, 320b). The columns 320a, 320b can be aligned with the sockets 430 so that the mechanisms 310 at the tip of the columns 320a, 320b can engage the sockets 430. After assembling the pedestal, the bottom spar 400 supports part of the total weight of the center tube 200 and satellite antenna. The weight is distributed onto the body 420 via the center tube connector 410 and then onto the foot pad 120 via the top spar and foot pad connector 415. The bottom spar 400 also supports weight of the top spar 300. The bottom spar 400 is in a horizontal direction or orientation with respect to the ground or other assembling surface (e.g., flatbed of a vehicle) after assembly. The bottom spar 400 also includes a structure 417, such as an extrusion, beam, rod, or the like, on the body 420 to engage a groove in a compartment of a container for storing the pedestal. The container for storing the pedestal includes a compartment for storing the bottom spar 400 and the compartment includes a groove for receiving the structure 417 of the bottom spar 400. The structure 417 of the bottom spar 400 is aligned with and inserted into the groove of the compartment. The bottom spar 400 can slide into the compartment via the structure 417 and groove by pushing the bottom spar 400 into the compartment. The compartment for storing the bottom spar 400 and the compartment for storing the top spar 300 may be the same compartment or different compartments.

Figure 5A:
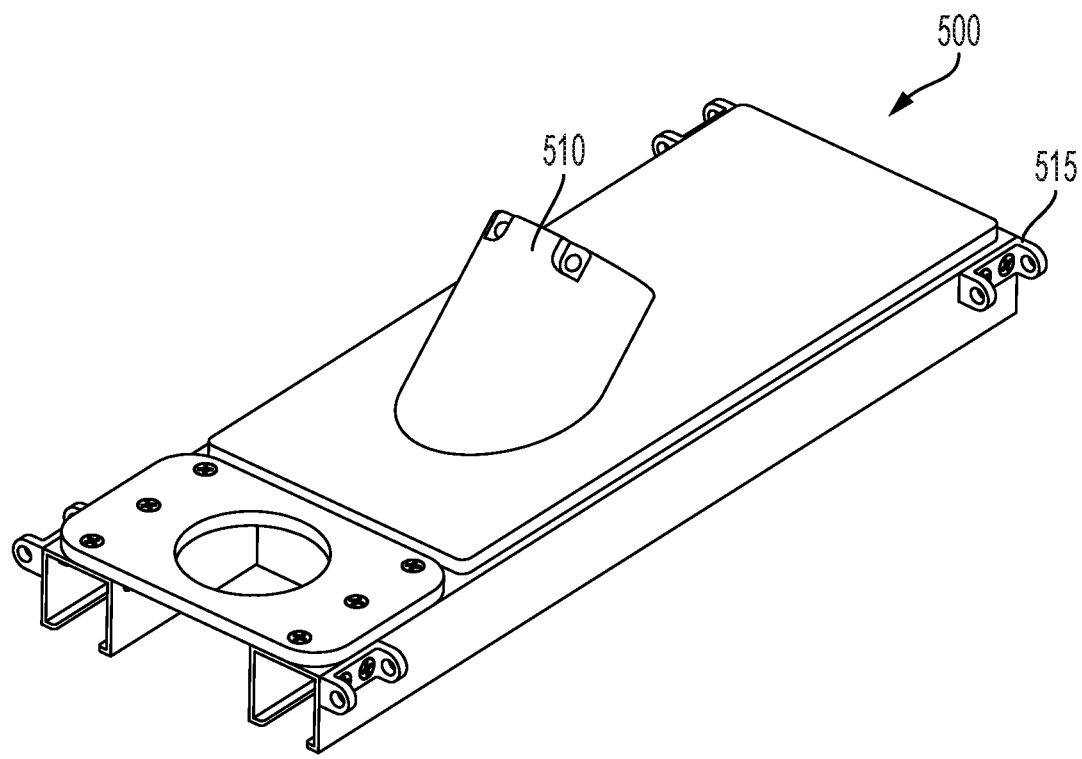
FIGS. 5-6 depict illustrative parts of a foot pad in accordance with some embodiments of the invention.
Figure 5B:
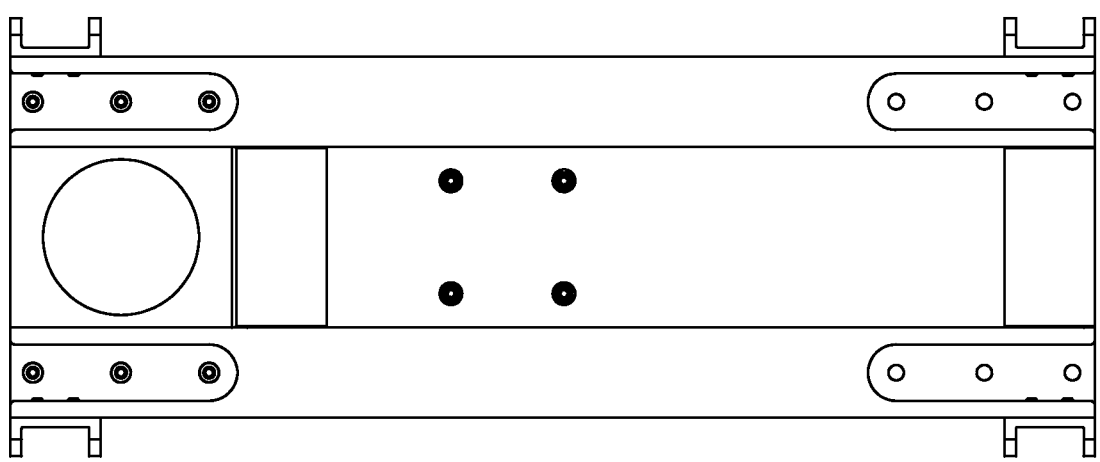
Figure 6:
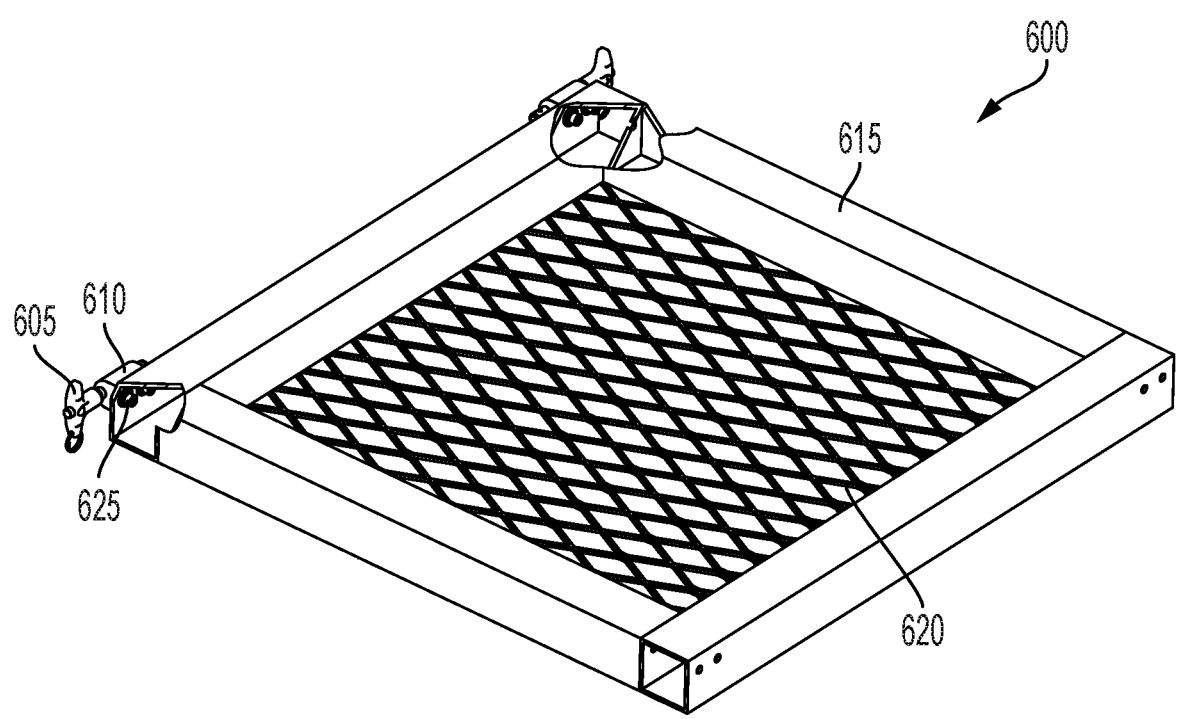
Figure 7:
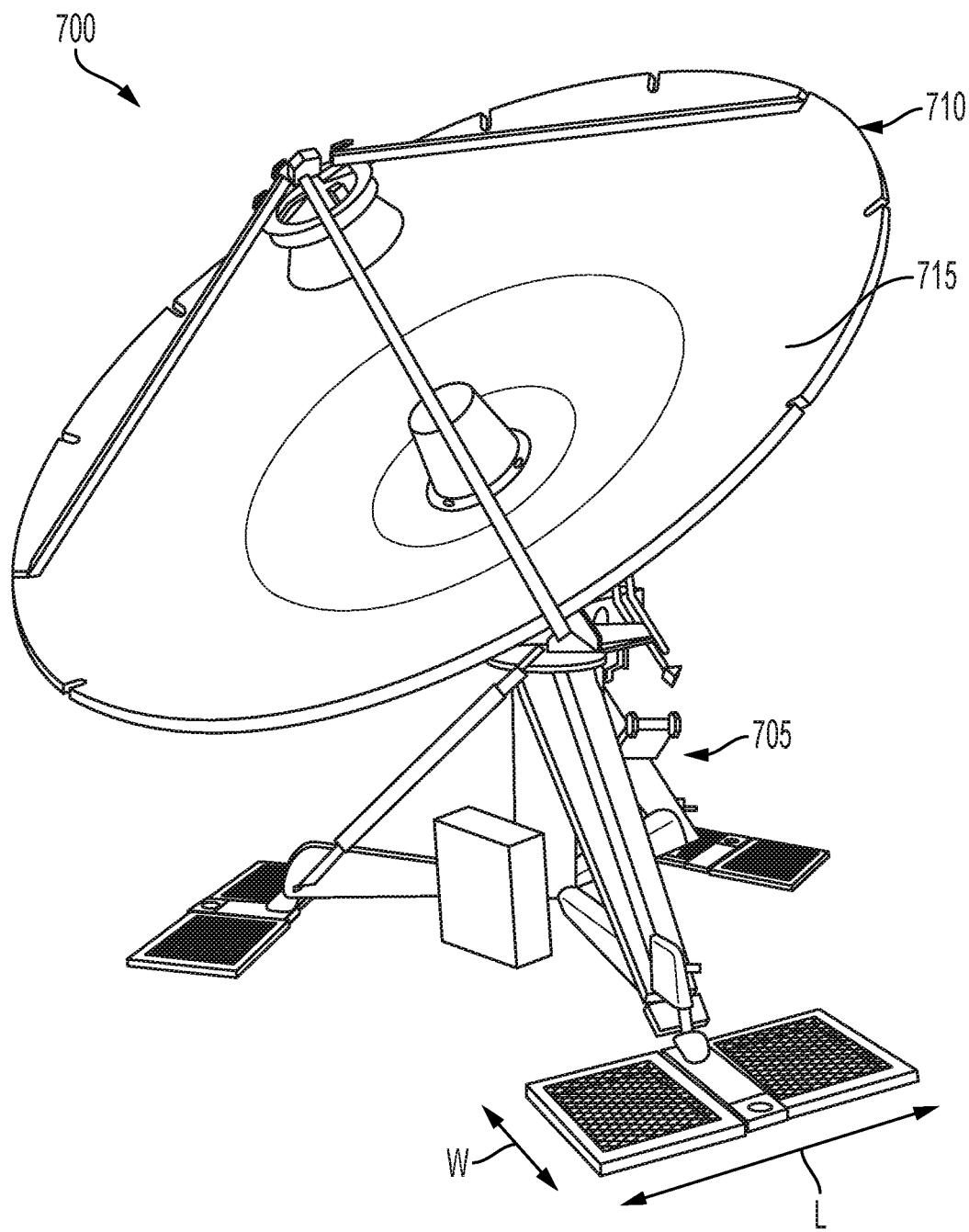
FIGS. 7-10 depict different views of a satellite communications terminal in accordance with some embodiments of the invention.
Figure 8:
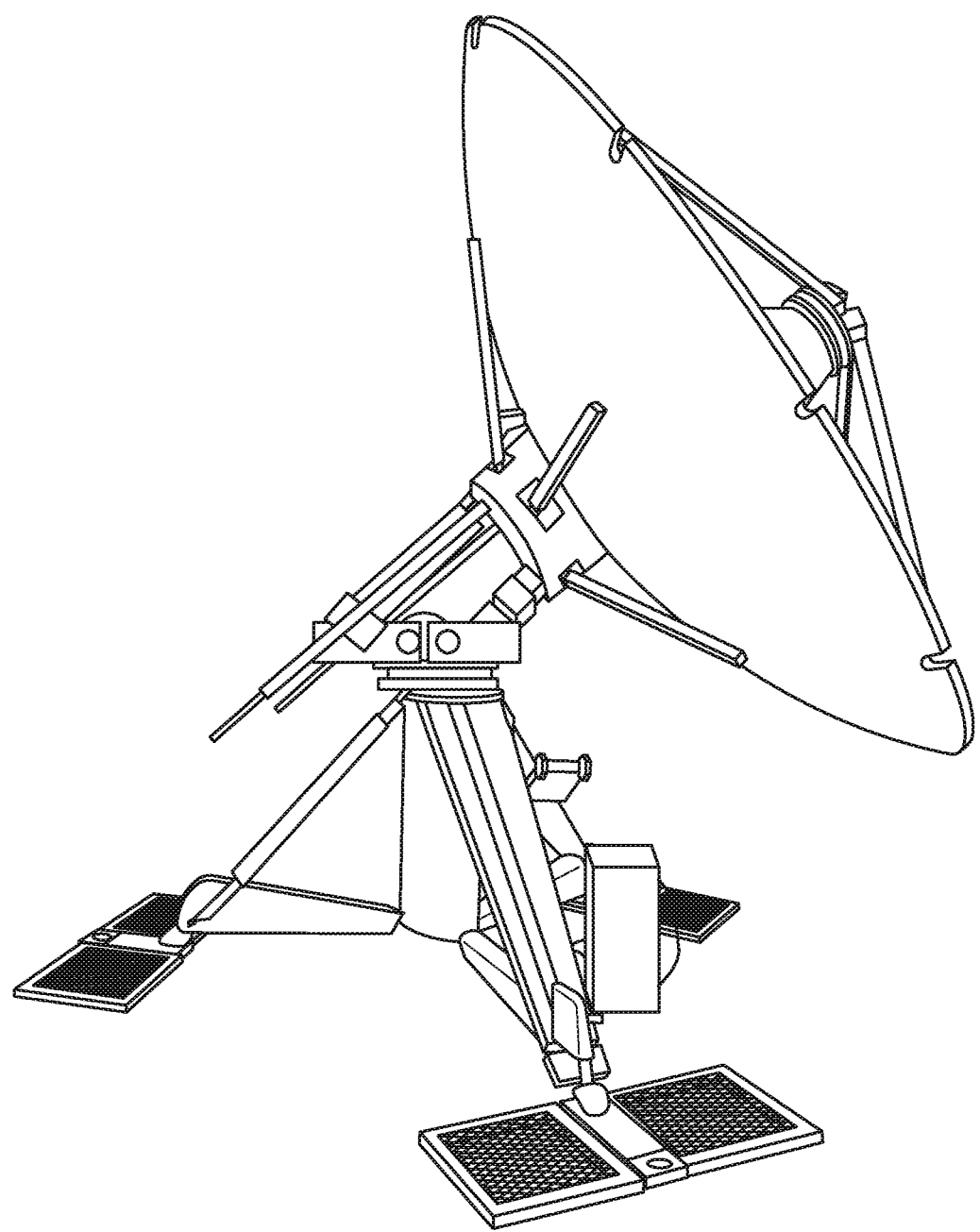
Figure 9:
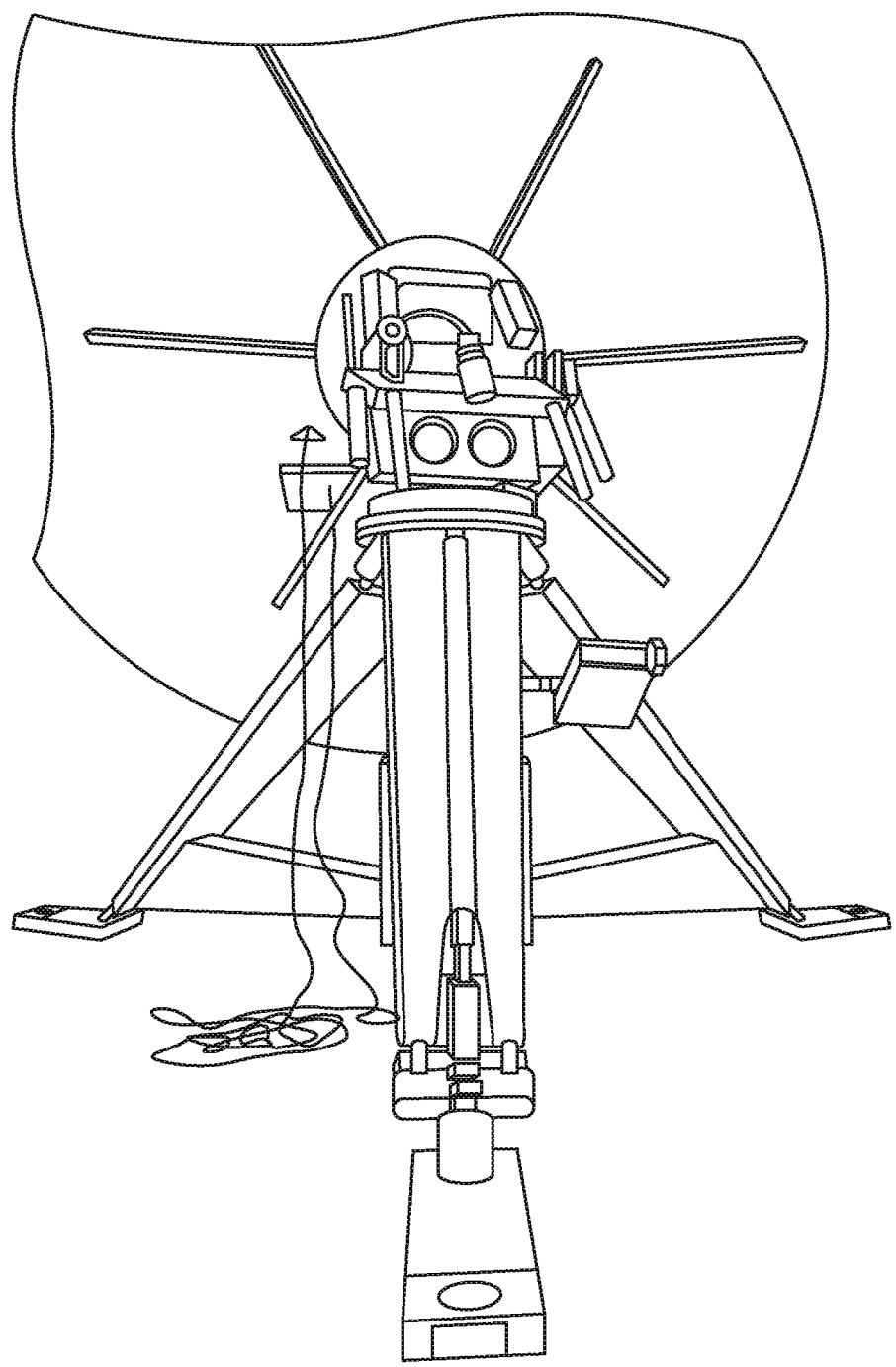
Figure 10:
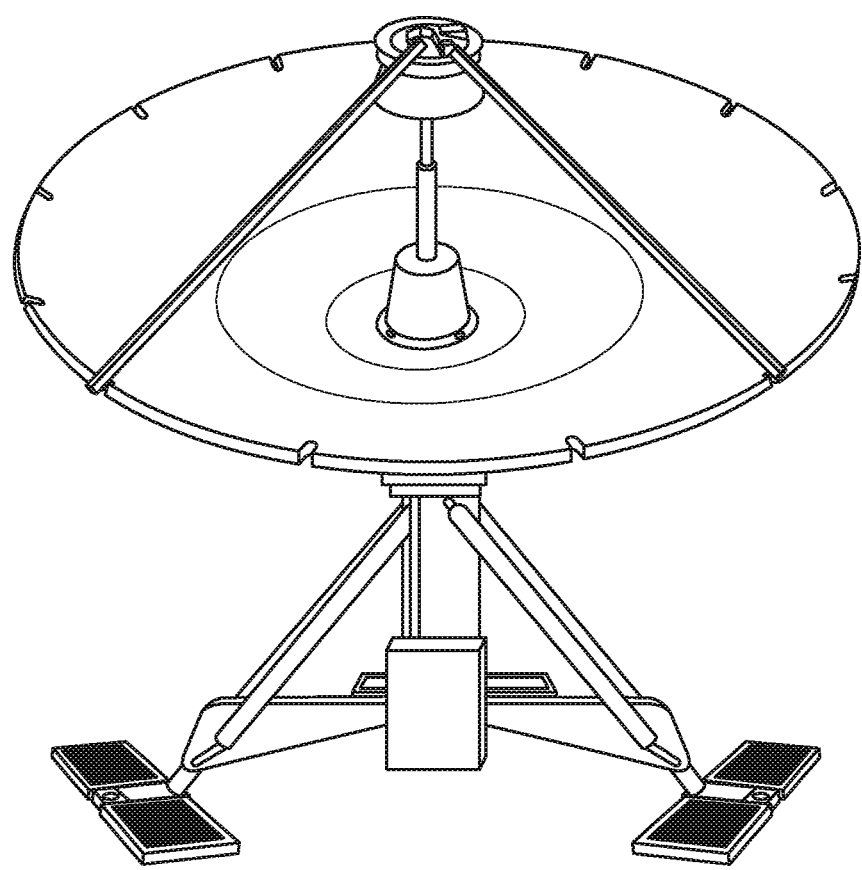

FIGS. 5-6 depict illustrative parts of a foot pad. A foot pad is the component of the pedestal that touches the ground or other assembling surfaces after assembly. A foot pad includes a foot pad joining apparatus and a foot pad tray. FIG. 5a depicts a perspective view of the foot pad joining apparatus 500 and FIG. 5b depicts a bottom view of the apparatus 500. FIG. 6 depicts an illustrative foot pad tray 600.

The foot pad joining apparatus 500 includes a socket 510 for receiving the protrusion 435 of the bottom spar 400 and one or more brackets 515 for receiving a mechanical knuckle (e.g., 610, FIG. 6, or a hollow, cylinder through which a pin is set) and a quick release pin (e.g., 605, FIG. 6) on the foot pad tray 600. The foot pad tray 600 includes a wall 615 and a bottom surface 620 defined by the wall 615. The foot pad tray 600 includes one or more mechanical knuckles 610 to be inserted into the brackets 515 (the knuckle fits in the bracket), and a quick-release pin 605 in each of the mechanical knuckles 610. In some embodiment, the quick-release pin 605 can be pre-inserted into the brackets 515 instead of the knuckles 610. The knuckles 610 are on one side 625 of the wall 615. The bottom surface 620 may be a wire mesh or other structures or materials that have a strength to receive weights or substantial amount of weight without breaking or being damaged (e.g., each mesh wire can receive a total weight up to 100 kg without bending). Weights can be placed or added on the wire mesh to further stabilize the pedestal (e.g., to withstand higher wind or other force attempt to mobilize the pedestal). The wire mesh also facilitates water drainage or placement on surfaces with water. The foot pad tray 600 may have a square, rectangular, or other shapes. The foot pad can be assembled by first releasing the pin 605 from the knuckle 610 or bracket 515, arranging the tray 600 and apparatus 500 to have the knuckle 610 inserted into the bracket 515, and inserting the pin 605 through the holes of the bracket 515 and the knuckle 610 to connect the apparatus 500 and the tray 600. The apparatus 500 and the tray 600 are inseparable until the pin(s) is released and can be disconnected by reversing the above assembly process. The apparatus 500 and the tray 600 may be provided as two separate parts that can be connected to form the foot pad. In some embodiments, the apparatus 500 and the tray 600 may be pre-connected and the pre-connected apparatus 500 and tray 600 may be provided in the container without a separate step to assemble the foot pad. The bracket 515 may be referred to as the tray connector.

The apparatus 500 and the tray 600 are constructed without mechanisms (e.g., fasteners) that could be used to secure the apparatus 500 and tray 600 to the ground or other assembling surface (other than the wire mesh for receiving weights), or structures (e.g., holes) for receiving such mechanisms. The apparatus 500 and the tray 600 are also constructed without structures or components configured to engage, grab, or penetrate the ground for further stability (e.g., protrusions, anchors, claws, teeth, etc.). The apparatus 500 and the tray 600 are laid on the ground and this allows the foot pad to be quickly placed and removed from the assembling surface. In some embodiments, the apparatus 500 and the tray 600 may have the mechanisms, structurers, and/or components mentioned above.

FIGS. 2a, 3b, 4b, and 5-6 show pedestal components provided for rapid deployment and assembly on the fields. The container includes a plurality of compartments and each individual pedestal component is stored in one of the compartments. The user takes the center tube 200 in FIG. 2a, the top spar 300 in FIG. 3b, the bottom spar 400 in FIG. 4b, and the foot pad joining apparatus and tray 500, 600 in FIGS. 5-6 out from the compartments to assemble the pedestal. FIG. 1 illustrates the assembly at the user level (operator level). FIGS. 2b, 3a, and 4a or the exploded views show detailed connections of the sub-components of each pedestal component that occur at the manufacturing level (e.g., at the manufacture's site or in the assembly line in a factory) or before the pedestal is used for the first time (before the pedestal is transported to a field for the first time).

Preferably, each pedestal component is made of a material that has low weight and high stiffness (i.e., high Young's modulus). More preferably, each pedestal component is made of carbon fiber or primarily carbon fiber, or composite containing carbon fiber. Carbon fiber also has other benefits including high tensile strength, high chemical resistance, high temperature tolerance and low thermal expansion. Materials having properties similar to carbon fiber are also contemplated. Other materials are also contemplated (e.g., aluminum). Each pedestal component may also be made of other materials and then be covered with carbon fiber or a carbon fiber skin (the process may also be known as laying process or layup process). Whether the pedestal component is made of carbon fiber, or other materials and then be covered with carbon fiber, a UV protectant clear coat and a protective over-laminate film can be further applied to the pedestal component. The material used to manufacture each pedestal component and the produced pedestal component meet aerospace and military performance standards for satellite communication terminals. Each pedestal component and the assembled pedestal can survive, or at least resist certain levels of, explosion, impact, vibration, wind, precipitation, temperature, friction, or other conditions encountered in the Earth's atmosphere, outer space, or war. The resistance levels are specified by the aerospace industry, military branches, department of defense, or other authorities. The pedestal can support a satellite antenna without issues up to the specified levels (e.g., can keep the satellite antenna stabilized or relatively stabilized so that the satellite antenna is pointing in the required direction or within the allowed direction range, e.g., ±4 degrees, for radio communication). Each pedestal component does not break, deform, or lose its structural integrity up to the specified levels. For example, the pedestal alone (without the satellite antenna, any weight on the foot pad, and any fastener for fixing the foot pad or pedestal to the assembling surface) can remain on the ground with winds up to 60 mph (without being blown away, being moved away from original location, being knocked over, or tipping over), or survive up to 100 mph while stowed. For example, the resistance levels may be specified by the MIL-STD-188-164 and/or MIL-STD-810 standards, and the pedestal or a terminal including the pedestal may be MIL-STD-188-164B and/or MIL-STD-810G compliant structure. FIG. 11 depicts illustrative technical specifications which include the pedestal's performance information. The pedestal's performance meets the required military standards for satellite communication terminals.

Each pedestal component is manufactured to have a weight that can be carried by no more than two individuals. Such a weight is preferably less than 160 lbs., or more preferably less than 150 lbs. In one embodiment, each of the pedestal components shown in FIG. 1 is made of carbon fiber. The center tube 105 weights approximately 147 lbs. and has a length approximately 48 inches and a diameter approximately 24 inches (diameter of the hollow section 205 or diameter measured from the outer circumference of the plate 210 including the follow section 205), the top spar 110 weights approximately 143 lbs. and has a length approximately 66 inches and a width approximately 17 inches (distance between one mechanism 305 and another mechanism 305 on the wider end of the top spar 300), the bottom spar 115 weights approximately 117 lbs. and has a length approximately 50 inches and a width approximately 15 inches (the width of the end of the bottom spar 115 for engaging the foot pad), and the foot pad 120 (including both the joining apparatus and tray) weights approximately 68 lbs. and has a length approximately 59 inches and a width approximately 24 inches (see FIG. 17). The total weight of the pedestal is approximately 600 lbs. Unlike the pedestal described in this application, conventional pedestals weight in 2000 lbs. range or more and are transported as is (already assembled) since the substantial weight does not make it feasible to assemble and disassemble the pedestal on the spot. Assembly and disassembly of conventional pedestals also require many people (more than two), lifting machines to move the pedestal components, and/or mechanical tools to connect and disconnect the pedestal components. From research and testing, embodiments of the invention were found capable of withstanding a moment up to 33,200 in-lbs. and deflecting less than approximately 0.048 degrees while withstanding a moment of approximately 33,200 in-lbs. The pedestal can withstand a moment up to 33,200 in-lbs. exerted on the satellite terminal or satellite antenna, and keeps the satellite terminal or satellite antenna from moving, tilting, or pointing away from its setup pointing direction under approximately 0.048 degrees while withstanding that load. The pedestal involves a minimal number of components and their small sizes allow them to be packed into a single standard sized shipping unit (e.g., having dimensions approximately 108" W×88" L×91" H). An assembled pedestal has a small footprint (e.g., the footprint or the circle of the footprint has a diameter approximately 172 inches). Thus, embodiments of the invention provide a small but strong pedestal that can endure extreme environmental conditions, that is transportable, and that can be quickly assembled and disassembled (or reused quickly).

The center tube can weigh between 140 and 160 lbs., have a length between 45 and 55 inches, and a diameter between 20 and 30 inches. The top spar can weigh between 40 and 45 lbs., have a length between 60 and 70 inches, a width between 15 and 20 inches. The bottom spar can weigh between 35 and 40 lbs., have a length between 45 and 55 inches, and a width between 10 and 20 inches. The foot pad can weigh between 60 and 75 lbs., have a length between 55 and 65 inches, and a width between 20 and 30 inches. The total weight of the assembled pedestal weighs between 500 and 700 lbs. The pedestal can withstand a moment or torque between 30,000 and 33,000 in-lbs. (highest moment or torque) and is capable of deflecting less than 0.048 degrees in extreme environmental conditions or when it is experiencing a moment or torque between 30,000 and 33,000 in-lbs. Satellite antennas need to be pointed in an accurate direction or angle in order to establish communications. The amount of deflection (e.g., 0.048 degrees) refers to the difference between the angle (the accurate angle) in which the satellite points in a calm or quiet environmental condition (e.g., wind speed is less than 10 miles per hour and/or moment is less than 200 in-lbs.) and the angle in which the satellite points in a different or violent environmental condition (e.g., wind speed is approximately 60 miles per hour and/or moment is between 30,000 and 33,000 in-lbs.).

The material, standards, compliance, weight, and other information described above with respect to the pedestal components also applies to the satellite antenna (described below). The satellite antenna (or at least the parabolic reflector), in one embodiment, is constructed with a precision-formed honeycomb core and a carbon fiber skin which assures durability and high performance.

FIGS. 7-10 depict different views of the described pedestal 705 supporting a satellite antenna 710, or a satellite communications terminal (SATCOM terminal) 700 including the describe pedestal 705 and an satellite antenna 710 connected to the pedestal 705. The SATCOM terminal 700 may also be referred to as a portable gateway class SATCOM terminal or a rapid capability terminal (RCT). The satellite antenna 710, for example, may be an antenna that uses a parabolic reflector to direct radio waves. Such an antenna may also be known as parabolic antenna, dish antenna, parabolic dish, or satellite dish. The satellite antenna 710 can receive or transmit information by radio waves to or from a communication satellite. The satellite antenna 710 can support one or more C, X, Ku, Ka bands of communication. The pedestal 705 can support different sizes of satellite antenna and antenna size up to 4 meters in diameter (referring to the diameter, radius, or concave surface of the parabolic reflector 710). Preferably, the pedestal 705 is used to support substantial satellite antennas with sizes ranging between 3 meters and 4 meters in diameter, and weights between 600 lbs. and 1200 lbs. Such size and weight antennas usually include a parabolic reflector assembled from multiple smaller reflector pieces 715 so that the antenna can also be assembled and disassembled quickly and be transported like or along with the pedestal (e.g., disassembled reflector pieces are also stored in the container). The reflector 710 has a total weight of between 700 lbs. to 900 lbs. Each of the reflector pieces 715 can weigh between 2 lbs. and 138 lbs. depending on the size of the satellite antenna used and can be carried and assembled and disassembled by just a few operators, or no more than two operators. The parabolic reflector 710 can be assembled first and then placed on the pedestal 705. The reflector pieces 715 may also be assembled on the pedestal 705 piece by piece so that the assembled reflector does not require a separate step to move the assembled reflector onto the pedestal 705. FIGS. 7-10 depict a 4.0 m multi-band (L/C/X/Ku/Ka) terminal 700. The size of the parabolic reflector is 4 meters (e.g., in diameter or radius). The terminal 700 may also include other features such as field changeable frequency band kits, simultaneous X/Ka 6-port feed, low-PIM (multi-carrier) X-band, high-throughput (>100 Mbps) links, auto-acquire & tracking ACU, and AC generators. An inflatable radome may be set up to protect the terminal 700.

FIG. 11 depicts illustrative technical specifications of the terminal 700. The specifications show that the terminal 700 meets certain military standards for satellite commutation terminals. For example, the specifications show that the satellite antenna supports communication bands (e.g., X-band and Ka-band) used by armed forces. The specifications also show that the terminal meets the interoperability and performance standards for Super High Frequency (SHE) satellite communications terminals (e.g., terminals that support X-band and Ka-band) such as MIL-STD-164B. The terminal can operate with wind speed up to 60 mph (i.e., can remain on the ground and communicate using one of the supported communication band, particularly X-band, Ka-band, or other band assigned specially for use by military) and survive up to 100 mph in stowed position. The terminal can also operate up to 10,000 ft in altitude or elevation (i.e., communicate using one of the supported communication band, particularly X-band, Ka-band, or other band assigned specially for use by military up to 10,000 ft in altitude) and survive up to 40,000 ft in stowed position. FIG. 11 also shows that the terminal meets other military standards and requirements. The terminal may be rugged to further strengthen durability. The terminal is also a MIL-STD-810G compliant structure.

Figure 12:
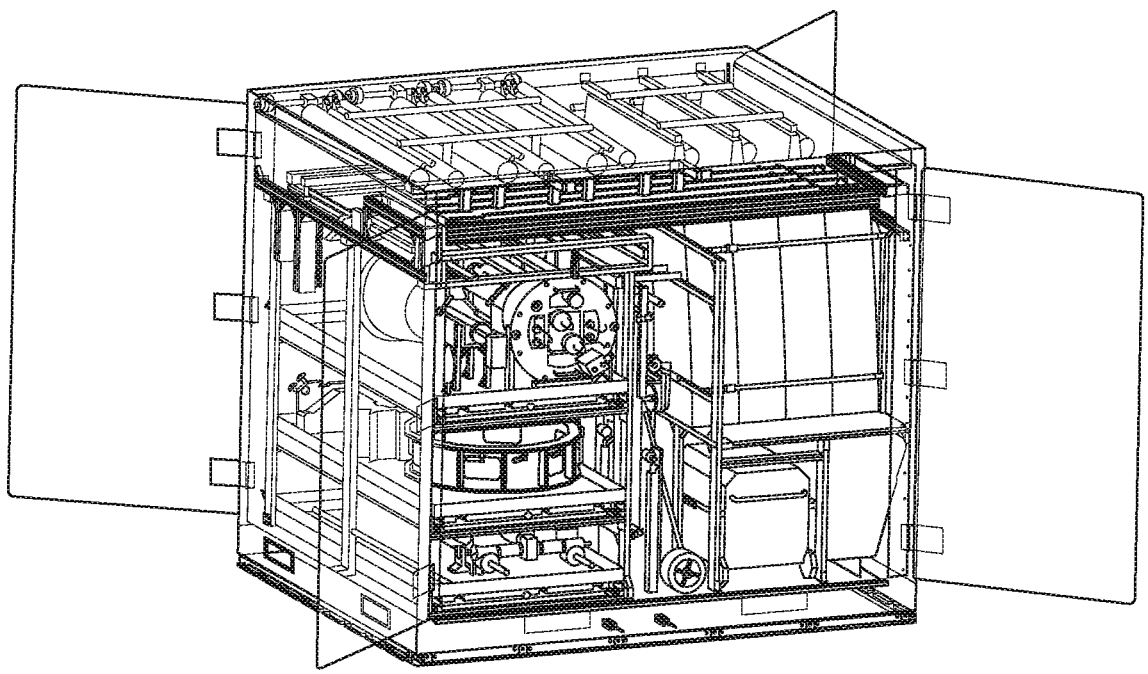
FIG. 12 depicts an illustrative ISU-90 container for storing pedestal components and reflector pieces in accordance with some embodiments of the invention.

The container, one embodiment, may be an Internal Stability Unit (ISU) container or an Internal Airlift/Helicopter Slingable Unit (ISU) container. The container may have one or more doors, and compartments shelves, trays, restraints, or a combination thereof for storing, securing, and protecting pedestal components and reflector pieces. The terminal includes only a small number of pedestal components and reflector pieces such that one container is sufficient to store all the parts. The container can be transported by a vehicle such as aircraft, watercraft, land-based vehicle. A wire or rope is used to connect the container to the aircraft, and the container can be lifted up by the aircraft and transported to different locations. The container can be dropped from air up the heights specified by military requirements without damaging the container or the pedestal components and reflector pieces inside. The container can also be placed on the deck, flatbed, or other surface on the watercraft or land-based vehicle for delivery. For example, the container may be an ISU-90 container. The container is preferably a military grade container such as an ISU-90 container. FIG. 12 depicts an illustrative ISU-90 container for storing the described pedestal components and reflector pieces. Other types of containers are also contemplated.

Each of the pedestal and the terminal (which includes both the pedestal and satellite antenna), before adding any weight on the foot pads or before being fixed to the assembly surface by other mechanisms such as screws, have sufficient weight to keep it stabilized on the ground such that simply shoving or kicking the pedestal or terminal by an individual is unable to knock over or tip over the pedestal or terminal, or otherwise displace the pedestal or terminal. The pedestal and terminal are unlike camera tripods or other tripods (without mechanisms such as screws that secure them to the ground) that can be mobilized when the same physical action or the same amount of force is applied. Each of the pedestal and terminal is light weight in the sense that they are light weight compared to conventional pedestals and terminals used in similar fields (e.g., radio communications field or military). Existing pedestals for supporting the same substantial size satellite antennas weight in 2000 lbs. range or more whereas the described pedestal weights no more than 450 lbs. Each individual pedestal component is even lighter when disassembled. The weight of existing pedestals may also require two or more containers to store their parts and be transported.

For the sake of brevity, the application focuses on certain aspects of the embodiments of the present invention. It should be noted that features, components, and/or structures in the attached figures that are not described in the above sections are also part of the disclosure and are understood from the attached figures.

Reference to a particular physical dimension or range (such as weight or length) is understood to refer to that specific number and to a range at or about ±25% of the number unless such approximation is specified for that dimension or range.

The above are illustrative of embodiments of the present invention. Variations, modifications, and generalizations are contemplated and understood to be part of the invention in view of the present disclosure. It should be understood that combinations of described features or steps are contemplated even if they are not directly described together or not in the same context. The words "may" and "can" are used in the present description to indicate that this is one embodiment but the description should not be understood to be the only embodiment. It is intended that the specification and examples be considered as exemplary only, with a true scope being indicated by the claims.

The invention claimed is:

1. A pedestal for supporting a satellite antenna comprising:
   a center tube including:
     a multi-prong connector, the multi-prong connector including a prong having a socket and a threaded surface adapted to connect with a center tube connector of a top spar and another prong having a socket and a threaded surface adapted to connect with a center tube connector of another top spar, and
     a quick-release pin and a pin supporting structure supporting the pin, the quick-release pin and pin supporting structure being adapted to connect with a center tube connector of a bottom spar;
   the top spar including:
     center tube connectors, each of the center tube connectors including a protrusion and a cap with a threaded surface, the protrusion and cap of the center tube connector being adapted to engage the socket and threaded surface of the prongs, and
     bottom spar connectors, each of the bottom spar connectors including a protrusion and a cap with a threaded surface, the protrusion and cap of the bottom spar connector being adapted to engage a socket and threaded surface of a top spar and foot pad connector on the bottom spar;
   the bottom spar including:
     the center tube connector being adapted to engage the pin supporting structure and including a hole to receive the pin, and
     the top spar and foot pad connector including sockets with threaded surfaces to engage the protrusions and caps of the bottom spar connectors on the top spar, and a protrusion to engage a foot pad connector of a foot pad; and
   the foot pad including:
     a foot pad joining apparatus, the apparatus including the foot pad connector having a socket adapted to connect with the protrusion of the top spar and foot pad connector on the bottom spar, and a tray connector adapted to connect with a connector of a foot pad tray, wherein the tray connector includes a bracket with holes to receive a quick-release pin; and
     the foot pad tray including the connector and a quick-release pin in the connector, wherein the connector without the pin fits in the bracket.

2. The pedestal of claim 1, wherein the cap of the center tube connector is adapted to turn by hand to tighten the connection between the top spar and the center tube.

3. The pedestal of claim 1, wherein the cap of the bottom spar connector is adapted to turn by hand to tighten the connection between the top spar and the bottom spar.

4. The pedestal of claim 1, wherein the top spar includes a region to receive a portion of the bottom spar.

5. The pedestal of claim 1, wherein the top spar includes two columns defining a bottom spar receiving region to receive a portion of the bottom spar.

6. The pedestal of claim 5, wherein the bottom spar connectors on the top spar are positioned at tips of the two columns.

7. The pedestal of claim 1, wherein the foot pad tray includes a mesh wire bottom surface for receiving weights.

8. The pedestal of claim 1, wherein each of the center tube, top spar, bottom spar, and foot pad is made of carbon fiber or primarily carbon fiber.

9. The pedestal of claim 1, wherein each of the center tube, top spar, bottom spar, and foot pad is adapted to be assembled using an off-the-shelf hardware tool.

10. A pedestal for supporting a satellite antenna comprising:
- a center tube including a top spar connector and a bottom spar connector, the top spar connector being adapted to connect with a center tube connector of a top spar and a center tube connector of another top spar, and the bottom spar connector being adapted to connect with a center tube connector of a bottom spar;
- the top spar including a center tube connector adapted to connect with the top spar connector of the center tube and a bottom spar connector adapted to connect with a top spar connector of a bottom spar;
- the bottom spar including a center tube connector adapted to connect with the bottom spar connector of the center tube and a top spar and foot pad connector adapted to connect with the bottom spar connector of the top spar and a foot pad connector of a foot pad; and
- the foot pad including a foot pad joining apparatus and a foot pad tray, the foot pad joining apparatus including a foot pad connector adapted to engage the top spar and foot pad connector and a tray connector adapted to connect with a connector of the foot pad tray, and the foot pad tray including a connector adapted to connect with the tray connector of the foot pad joining apparatus, wherein the top spar connector of the center tube includes a socket and a threaded surface.

11. The pedestal of claim 10, wherein the center tube connector of the top spar includes a protrusion and a cap with a threaded surface.

12. The pedestal of claim 10, wherein the center tube connector of the bottom spar includes a hole adapted to engage with the bottom spar connector.

13. The pedestal of claim 10, wherein the top spar and foot pad connector includes a socket and a threaded surface to connect with the top spar.

14. The pedestal of claim 10, wherein the top spar and foot pad connector includes a protrusion to connect with the foot pad.

15. The pedestal of claim 10, wherein each of the center tube, top spar, bottom spar, and foot pad is adapted to be assembled using an off-the-shelf hardware tool.

16. A satellite communication terminal including the pedestal of claim 10, and a satellite antenna supported by the pedestal.

17. The terminal of claim 16, wherein the satellite antenna includes a parabolic reflector having a 4 meter diameter or radius and is assembled from a plurality of reflector pieces.

18. The terminal of claim 16, wherein the satellite antenna supports a military communication band and the terminal is a MIL-STD-188-164B or MIL-STD-810G compliant structure.

19. A pedestal for supporting a satellite antenna comprising:
- a center tube including:
  - a multi-prong connector, the multi-prong connector including a prong having a socket and a threaded surface adapted to connect with a center tube connector of a top spar and another prong having a socket and a threaded surface adapted to connect with a center tube connector of another top spar, and
  - a bottom spar connector,
- the top spar including:
  - center tube connectors, each of the center tube connectors including a protrusion and a cap with a threaded surface, the protrusion and cap of the center tube connector being adapted to engage the socket and threaded surface of the prongs, and
  - bottom spar connectors, each of the bottom spar connectors including a protrusion and a cap with a threaded surface, the protrusion and cap of the bottom spar connector being adapted to engage a socket and threaded surface of a top spar and foot pad connector on a bottom spar;
- the bottom spar including:
  - a center tube connector to connect with the center tube, and
  - the top spar and foot pad connector including sockets with threaded surfaces to engage the protrusions and caps of the bottom spar connectors on the top spar, and a protrusion to engage a foot pad connector of a foot pad; and
- the foot pad to connect with the protrusion of the top spar and foot pad connector on the bottom spar, the foot pad including a wire mesh bottom surface for receiving weights.

* * * * *